US008279372B2

(12) United States Patent
Shimura et al.

(10) Patent No.: US 8,279,372 B2
(45) Date of Patent: Oct. 2, 2012

(54) PLANAR LIGHT-EMITTING DEVICE AND LIQUID CRYSTAL DISPLAY APPARATUS

(75) Inventors: Takashi Shimura, Yamanashi-ken (JP); Taku Kumasaka, Tsuru (JP)

(73) Assignee: Citizen Electronics Co., Ltd., Yamanashi-Ken (JP)

( * ) Notice: Subject to any disclaimer, the term of this patent is extended or adjusted under 35 U.S.C. 154(b) by 175 days.

(21) Appl. No.: 12/434,860

(22) Filed: May 4, 2009

(65) Prior Publication Data
US 2009/0273733 A1 Nov. 5, 2009

(30) Foreign Application Priority Data

May 2, 2008 (JP) ................................. 2008-120393
Jun. 18, 2008 (JP) ................................. 2008-159714

(51) Int. Cl.
*G02F 1/1335* (2006.01)
*F21V 7/04* (2006.01)
(52) U.S. Cl. ............................. 349/65; 362/615; 362/616
(58) Field of Classification Search ................... 349/65; 362/615, 616
See application file for complete search history.

(56) References Cited

U.S. PATENT DOCUMENTS

| 6,927,812 B2* | 8/2005 | Cho ................................ 349/65 |
| 7,699,517 B2* | 4/2010 | Lai ................................ 362/615 |
| 2006/0221638 A1* | 10/2006 | Chew et al. ................... 362/613 |
| 2006/0245213 A1* | 11/2006 | Beil et al. ..................... 362/616 |
| 2007/0274100 A1* | 11/2007 | Yang et al. .................... 362/615 |
| 2009/0002598 A1* | 1/2009 | Choo et al. ..................... 349/62 |

FOREIGN PATENT DOCUMENTS

| JP | 09-186825 | 7/1997 |
| JP | 11-288611 | 10/1999 |
| JP | 2006-522436 | 9/2006 |
| JP | 2007-293339 | 11/2007 |

OTHER PUBLICATIONS

Office Action mailed Jun. 26, 2012 in corresponding Japanese Application No. 2008-159714 (with English translation).

* cited by examiner

*Primary Examiner* — Mark Robinson
*Assistant Examiner* — Robert Tavlykaev
(74) *Attorney, Agent, or Firm* — Wenderoth, Lind & Ponack, L.L.P.

(57) ABSTRACT

A planar light-emitting device comprises a plurality of light-emitting units each including a lightguide plate and arranged adjacent to each other. Each lightguide plate has an upper surface as a light-exiting surface, a lower surface opposite to the upper surface, and a peripheral side surface extending between the peripheral edges of the upper surface and the lower surface, wherein a light-entrance surface is defined by a part of the peripheral side surface. The light-entrance surface has a first protruding portion extending from and along the light-entrance surface and an opposite surface opposing the light-entrance surface has a second protruding portions extending from and along the opposite surface. In each adjacently disposed pair of light-emitting units, the first protruding portion of the first light-emitting unit abuts against the second protruding portion of the second light-emitting unit. The light source is disposed underneath the abutting first and second protruding portions.

17 Claims, 8 Drawing Sheets

PLANAR LIGHT-EMITTING DEVICE AND LIQUID CRYSTAL DISPLAY APPARATUS

This application claims priority under 35 U.S.C. §119 to Japanese Patent application No. JP2008-120393 filed on May 2, 2008 and Japanese Patent application No. JP2008-159714 filed on Jun. 18, 2008, the entire contents of which are hereby incorporated by reference.

TECHNICAL FIELD

The present invention relates to a planar light-emitting device that illuminates a liquid crystal display panel or the like. The present invention also relates to a liquid crystal display apparatus using such a planar light-emitting device.

BACKGROUND ART

Liquid crystal display apparatuses are widely used as the large-sized displays of flat-screen televisions and monitors, etc. These liquid crystal display apparatuses employ a backlight unit that applies illuminating light to a liquid crystal display panel from the back or the lower side of the liquid crystal display panel to enhance the luminance of the display screen.

The backlight unit has a lightguide plate and a light source comprising, for example, a plurality of light-emitting diodes (LEDs) disposed along one side edge surface of the lightguide plate. The lightguide plate receives light from the LED light source, guides the light through the lightguide plate and emits the guided light from the whole light-exiting surface of the lightguide plate toward a liquid crystal display panel.

Recently, as liquid crystal televisions increase in size, backlight units used therein have been demanded to further reduce in weight and thickness. In this regard, there have been some problems to be solved. As the thickness of a lightguide plate constituting a backlight unit is reduced, it becomes likely that color irregularity and luminance unevenness will occur in light emitted from the lightguide plate. If injection molding is employed as a method of producing a large-sized lightguide plate, it is difficult to fill the resin material throughout the molding tool for the large lightguide plate. Increasing the injection pressure can solve this problem, which, however, causes an increase in installation cost. Extrusion molding can produce large-sized and thin lightguide plates but cannot appropriately form microscopic optical configurations on the lightguide plates.

Meanwhile, there have been developed planar light-emitting devices in which a plurality of lightguide plates are arranged side by side with their respective upper surfaces as light-exiting surfaces being flush with each other and a plurality of light sources are provided in association with the lightguide plates to obtain a wide light-exiting surface (see Japanese Patent Application Publication Nos. 2007-293339 and Hei 11-288611).

In the planar light-emitting device disclosed in Japanese Patent Application Publication No. 2007-293339, however, a light source for emitting light into one rectangular lightguide plate through a light-entrance surface, which is one end edge surface of the lightguide plate, is set in a cut portion formed in an opposing end edge surface of another lightguide plate adjacent to the one lightguide plate. Therefore, a part of light emitted from the light source may leak out upward through a gap between the respective end edge surfaces of the mutually adjacent lightguide plates, causing bright lines to appear undesirably. In the planar light-emitting device disclosed in Japanese Patent Application Publication No. Hei 11-288611, one of the opposing end edge portions of each pair of mutually adjacent lightguide plates is reduced in thickness, and the other end edge portion is provided with a step-shaped recess that receives the thinned end edge portion, thereby allowing the opposing end edge portions to overlap each other. With this structure, however, light emitted from an associated light source is reflected upward at the overlapping portions, causing bright lines undesirably.

SUMMARY OF THE INVENTION

The present invention has been made in view of the above-described problems. Accordingly, an object of the present invention is to provide a planar light-emitting device that has a large light-exiting surface formed by using a plurality of lightguide plates and that is capable of preventing the occurrence of bright lines. Another object of the present invention is to provide a liquid crystal display apparatus using the planar light-emitting device of the present invention.

The present invention provides a planar light-emitting device including a plurality of light-emitting units. Each light-emitting unit has a lightguide plate having an upper surface as a light-exiting surface, a lower surface opposite to the upper surface, a peripheral side surface extending between the respective peripheral edges of the upper and lower surfaces, and a light-entrance surface defined by a part of the peripheral side surface. Each light-emitting unit further has an LED light source adjacently disposed to face the light-entrance surface to emit light into the lightguide plate through the light-entrance surface. The light-emitting units are arranged adjacent to each other such that the light-exiting surfaces of their respective lightguide plates are substantially flush with each other. Each lightguide plate has an opposite surface opposite to the light-entrance surface and defined by a part of the peripheral side surface and further has first and second protruding portions protruding from and along the light-entrance surface and the opposite surface, respectively. In each pair of adjacently disposed light-emitting units wherein the light-entrance surface of the lightguide plate of one of the adjacently disposed light-emitting units of the pair is opposed to the opposite surface of the lightguide plate of the other of the adjacently disposed light-emitting units of the pair, the first protruding portion in the one light-emitting unit abuts against the second protruding portion in the other light-emitting unit. The LED light source in each of the light-emitting units has a light-exiting surface disposed underneath the first protruding portion of the associated lightguide plate that receives light through the light-exiting surface of the LED light source.

In the planar light-emitting device of the present invention, the light-exiting surface of the LED light source is disposed underneath the first protruding portion of the lightguide plate that receives light from the LED light source. Therefore, it is possible to avoid the problems with the above-described conventional planar light-emitting devices, i.e. the leakage of light through the gap between a pair of mutually adjacent lightguide plates, and the occurrence of bright lines on the light-exiting surface of the planar light-emitting device due to the refraction of light at the step portions or edge portions of the mutually adjacent lightguide plates.

Specifically, the planar light-emitting device may be arranged as follows. The first and second protruding portions each have an upper surface, a lower surface opposite to the upper surface, and a distal end surface extending between the respective distal end edges of the upper and lower surfaces. In the each pair of adjacently disposed light-emitting units at the light-entrance surface of one and the opposite surface of the other, the distal end surface of the first protruding portion in the one light-emitting unit abuts against the distal end surface of the second protruding portion in the other light-emitting unit.

More specifically, the second protruding portion of the light-entrance surface may protrudes more than the first protruding portion of the opposite surface. This is to prevent a reduction in the luminance on the light-exiting surface at the first protruding portion of the light-entrance surface.

The light-emitting units may each have the LED light source and the lightguide plate integrated together.

The lightguide plates may each be rectangular in plan view and have a ratio of a short side to a long side of the lightguide unit from 0.5 to 0.6, and the light-emitting units may be arranged in a matrix in which numbers of rows and columns are equal to each other. The lightguide plates may be square in plan view and arranged in a matrix.

In the each pair of adjacently disposed light-emitting units, the light-emitting diode light source may be disposed under the abutting first and second protruding portions.

When the lightguide plate is made in the rectangular shape, the right and left side edge surfaces of the lightguide plate may be provided with projecting portions each projecting from each of the right and left side edge surfaces and having an outwardly and downwardly inclined upper surface extending from the light-exiting surface of the lightguide plate. The lightguide plates may arranged to face each other at the respective right and left side edge surfaces.

Further, the upper surfaces of the first and second protruding portions of each light guide plate may be flush with the upper surface or light-exiting surface of the lightguide plate.

In addition, the present invention provides a liquid crystal display apparatus including a liquid crystal display panel and the above-described planar light-emitting device, which is disposed at the back or the lower side of the liquid crystal display panel.

Embodiments of the present invention will be explained below with reference to the accompanying drawings. It should be noted that the scale of the figures used in the following explanation is properly changed to facilitate understanding of each constituent member.

DETAILED DESCRIPTION OF THE INVENTION

Figure 1:
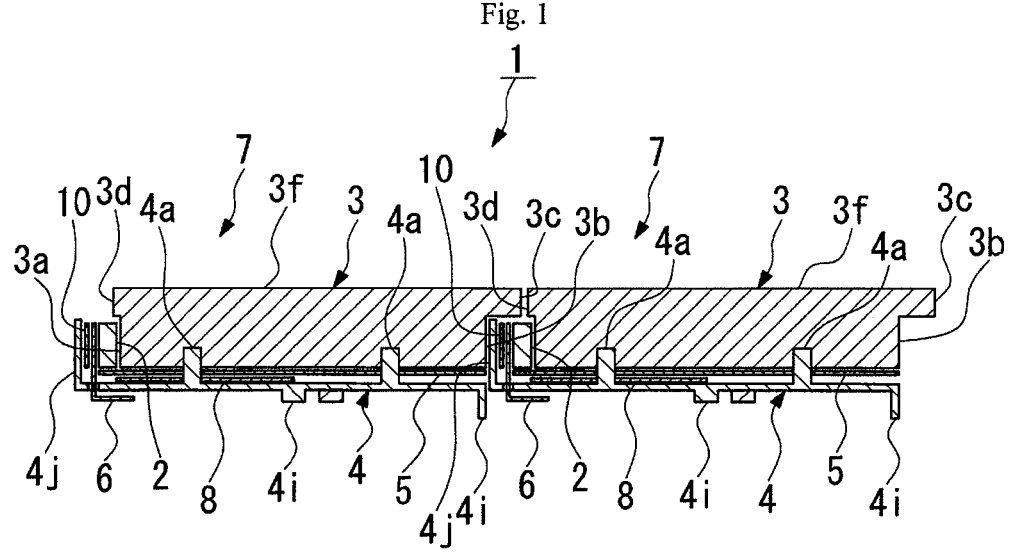
FIG. 1 is a sectional view showing two mutually adjacent light-emitting units in a first embodiment of the planar light-emitting device according to the present invention.
Figure 2:
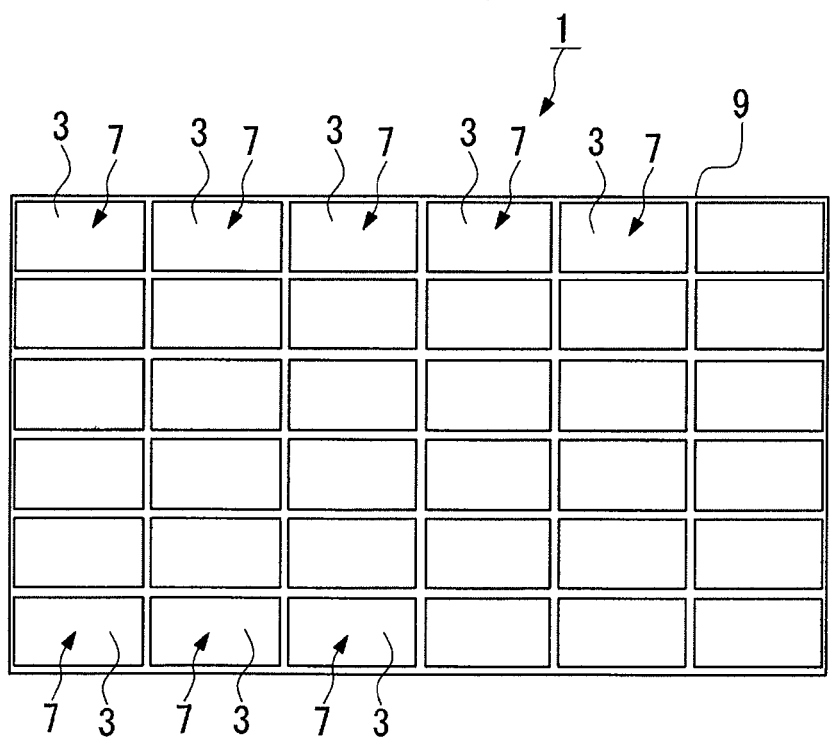
FIG. 2 is a plan view showing the planar light-emitting device including a plurality of adjacently disposed light-emitting units in the first embodiment.

FIGS. 1 to 7 show a planar light-emitting device 1 according a first embodiment of the present invention. The planar light-emitting device 1 is a backlight unit of a liquid crystal display apparatus. As shown in FIGS. 1 and 2, the planar light-emitting device 1 comprises a plurality of light-emitting units 7 arranged adjacent to each other in a matrix. Each light-emitting unit 7 has an LED light source (light source) 2, a lightguide plate 3, and a support member 4 securely supporting the LED light source 2 and the lightguide plate 3 on an upper surface of the support member 4, a reflecting sheet 5 installed between the upper surface of the support member 4 and the lower surface of the lightguide plate 3, and a flexible printed circuit board (FPC) 6 connected to the LED light source 2 at the distal end portion of the FPC 6. In this embodiment, the light-emitting units 7 are arranged in a matrix of 6 rows and 6 columns as shown in FIG. 2, for example.

The lightguide plate 3 is rectangular in plan view having an upper surface as a light-exiting surface 3f, a lower surface opposite to the upper surface, and a peripheral side surface between the upper surface and the lower surface, the peripheral side surface including a light-entrance surface 3a that receives light from the LED light source 2, an opposite surface 3b opposite to the light-entrance surface 3a, right and left side edge surfaces extending between the light entrance surface 3a and the opposite surface 3b. The lightguide plate 3 is formed of a resin; a transparent polycarbonate or acrylic resin, for example.

The light-entrance surface 3a and the opposite surface 3b have respective protruding portions; a first protruding portion 3d at the light-entrance surface 3a and a second protruding portion 3c at the opposite surface, each having a surface flush with the light-exiting surface 3f. The second protruding portion 3c at the opposite surface protrudes more than the first protruding portion 3d at the light-entrance surface. In each adjacently disposed pair of light-emitting units 7 facing each other at the light-entrance surface of a first lightguide plate 3 in a first light-emitting unit 7 and the opposite surface of a second lightguide plate 3 in a second light-emitting unit 7, a first protruding portion 3d of the first lightguide plate 3 are disposed to substantially abut against the second protruding portion 3d of the second lightguide plate 3 adjacently disposed to face the light-entrance surface of the first lightguide plate.

Figure 3:
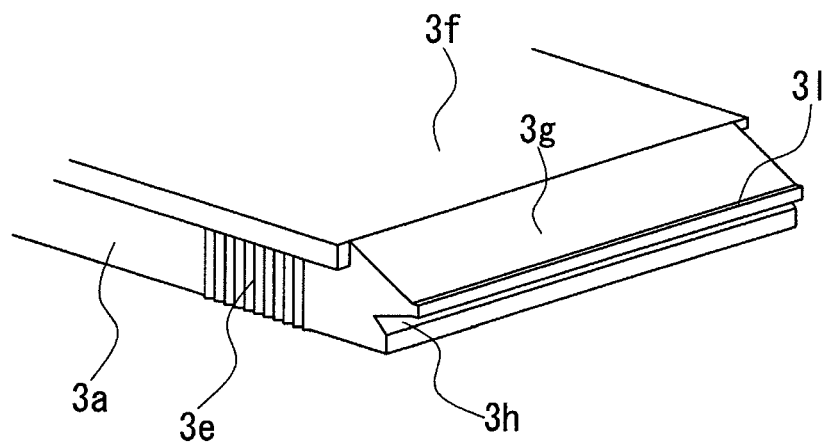
FIG. 3 is a fragmentary perspective view of a lightguide plate used in each of the light-emitting units in the first embodiment as seen from the side of the light-entrance surface and the right side edge surface of the lightguide plate.
Figure 4:
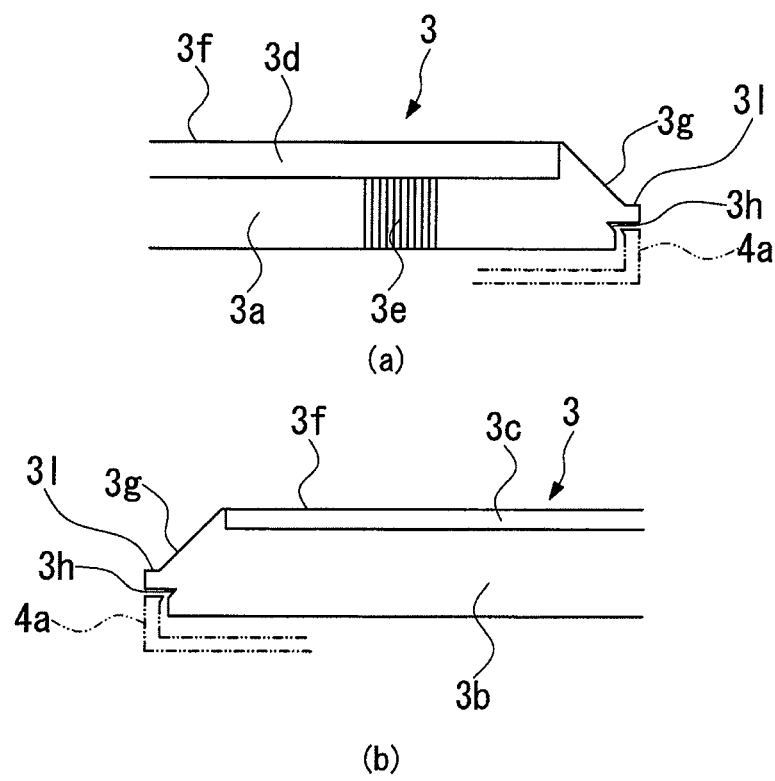
FIG. 4 is a diagram including fragmentary enlarged front view (a) as seen from the light-entrance surface side and fragmentary enlarged rear view (b) opposite to the light-entrance surface side of the lightguide plate in the first embodiment.

The light-entrance surface 3a has, as shown in FIGS. 3 and 4, a plurality of prisms 3e of V-shaped sectional configuration that extend on the light-entrance surface 3a between both edges of the upper surface and the lower surface of the lightguide plate; in the thickness direction, of the lightguide plate 3 to cause incident light to diverge in the width direction of the light-entrance surface 3a. The light-exiting surface 3f has, for example, a white dot pattern (not shown) formed on the light-exiting surface 3f. The lower surface may be provided with prism- or lenticular lens-shaped microscopic optical configurations, for example, to direct light toward the upper surface as the light-exiting surface 3f. For example, the lower surface may be provided with prism-shaped microscopic optical configurations having a sectional shape of an isosceles triangle. In this case, the apex angle of the prisms of the lower surface may be set to gradually increase with the prism-shaped microscopic optical configurations being situated farther away from the LED light source 2. Alternatively, the lower surface may be provided with prism-shaped microscopic optical configurations having a sectional shape of a scalene triangle. In this case, the depth of the prism configuration may be set to gradually increase or the prism pitch may be set to gradually decrease as the prism apex angle increases.

Figure 5:
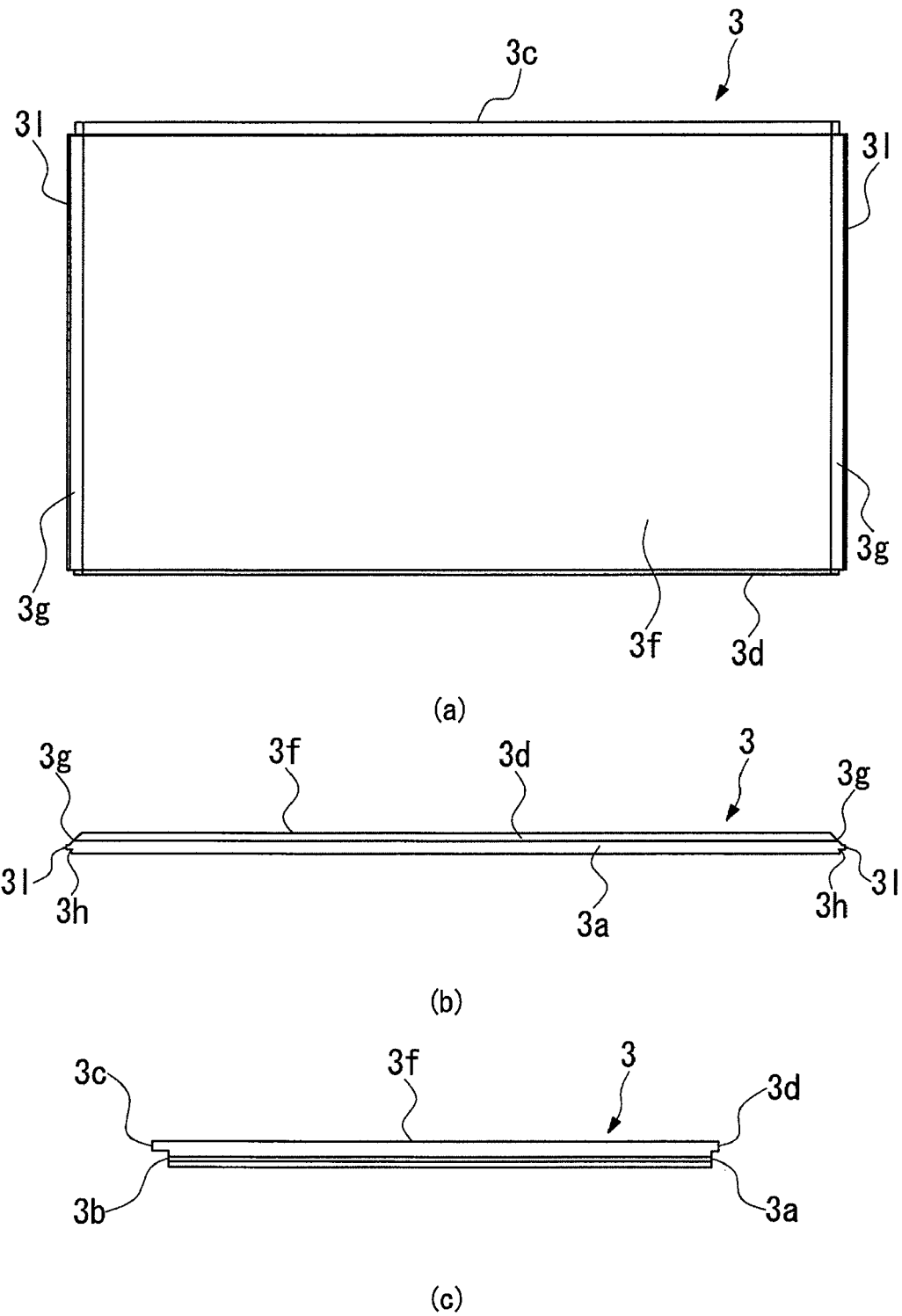
FIG. 5 is a diagram of the lightguide plate of the first embodiment including a top plan view (a), front view (b) and a side elevational view (c), the side elevational view showing a side edge surface provided with a projecting portion with an inclined upper surface extending from a light-exiting surface of the lightguide plate.

The right and left side edge surfaces of the lightguide plate 3 each have, as shown in FIGS. 3 to 5, a projecting portion 3g having an inclined surface at the top of the projecting portion 3g that is downwardly and outwardly inclined from the upper surface of the lightguide plate. The inclined surface of the projecting portion 3g is inclined at 45°, for example, with respect to the upper surface as the light-exiting surface 3f. The inclined surface at the top of the projecting portion 3g refracts upward light exiting from the inclined surface to compensate for the lack of luminance at the area between the mutually adjacent lightguide plates 3; the area around the right and left side edge surfaces of the lightguide plates 3. The lightguide plates of the light-emitting units disposed in a matrix as shown in FIG. 2, face each other at least one of the respective right and left side edge surfaces.

The projecting portion 3g has at the distal end of the inclined surface a pin abutting portion 3l against which an ejector pin can abut. The projecting portion 3g has a hook retaining portion 3h in the shape of a groove having a V-shaped sectional configuration; the groove is engraved laterally in the lightguide plate at the bottom of the projecting portion 3g. The hook retaining portion 3h is fitted with the distal ends of a plurality of hook-shaped lightguide plate hooks 4a extending upward from the right and left side edges of the support member 4 to retain the lightguide plate hooks 4a.

A part of the upper surface of the projecting portion 3g that includes the upper surface of the pin abutting portion 3l and the neighborhood of the pin abutting portion 3l is provided with microscopic optical configurations (not shown), e.g. prism-, embossed- or dot-shaped microscopic optical configurations. The microscopic optical configurations compensate for the reduction of luminance due to the presence of the hook retaining portion 3h and the lightguide plate hooks 4a disposed underneath the projecting portion 3g.

The LED light source 2 comprises white LEDs. The white LED is, for example, a semiconductor light-emitting element mounted on a substrate and sealed with a resin material. The semiconductor light-emitting element is, for example, a blue (wavelength λ: 470 to 490 nm) LED element or an ultraviolet (wavelength λ: less than 470 nm) LED element, which is formed by stacking a plurality of semiconductor layers of a gallium nitride compound semiconductor (e.g. InGaN compound semiconductor) on an insulating substrate, e.g. a sapphire substrate.

The resin material used to seal the semiconductor light-emitting element is formed, for example, by adding a YAG fluorescent substance into a silicone resin as a main component. The YAG fluorescent substance converts blue or ultraviolet light from the semiconductor light-emitting element into yellow light, and white light is produced by color mixing effect. The LED light source 2 has a reflecting frame formed on the resin material side surfaces of the sealing resin except the front end surface (light-exiting surface) opposed close to the light-entrance surface 3a of the lightguide plate 3 so as to emit light only from the front end surface. Accordingly, light-exiting from the front end surface of the LED light source 2 cannot leak out through the gap between the first and the second protruding portions 3d and 3c of the adjacently disposed pairs of lightguide plates 3 that faces and abut against each other at the first protruding portion 3d of the entrance surface of the first lightguide plate 3 and the second protruding portion 3c of the opposite surface of the second lightguide plate 3 as described before. It should be noted that white LEDs are not limited to those described above, but various white LEDs are usable.

A reflecting sheet 5 disposed underneath the lower surface of the lightguide plate 3 is a metal plate, film, foil or the like having a light-reflecting function. In this embodiment, the reflecting sheet 5 is a film provided with an evaporated silver layer. It should be noted, however, that an evaporated aluminum layer or the like may be used in place of the evaporated silver layer. The reflecting sheet 5 is bonded onto the support member 4 by using double-coated adhesive tape 8.

Figure 6:
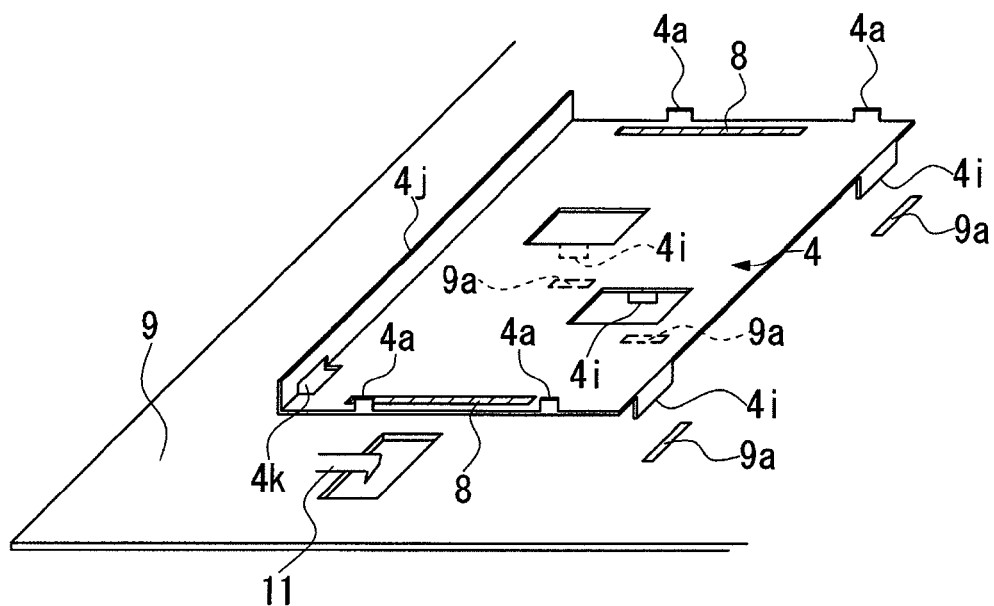
FIG. 6 is an exploded perspective view of a rigid board and a support member in the first embodiment.

The support member 4 is, as shown in FIG. 6, installed on a rigid board (board) 9 of an apparatus in which the planar light-emitting device is incorporated. That is, the support member 4 has a plurality of downwardly projecting board hooks 4i, which are fitted into corresponding hook holes 9a formed in the rigid board 9 to secure the support member 4 to the rigid board 9.

The support member 4 is provided with an upwardly bent LED support portion 4j at one side edge of the support member 4. As shown in FIG. 1, the LED support portion 4j supports the LED light source 2, together with the FPC board 6, through a heat-dissipating sheet 10, for example. Examples of materials usable as the heat-dissipating sheet 10 are copper or other metal sheets, thermally conductive film such as Kapton (available from DuPont), and phase change sheet such as PCS-TC-20 (available from Shin-Etsu Silicones).

The LED light source 2, the FPC board 6, the heat-dissipating sheet 10 and the LED support portion 4j are disposed in the gap between the mutually adjacent lightguide plates 3. That is, in the adjacent pairs of lightguide plates 3; in each pair of which the lightguide plates are disposed such that the first protruding portion 3d of the first lightguide plate 3 and the second protruding portion 3c of the second lightguide plate 3 abut against each other as described before, the LED light source 2 associated with or included in the first light-emitting unit 7 are disposed in a space formed underneath the abutting first protruding portion 3d and the second protruding portion 3d.

The FPC board 6 is connected to the LED light source 2 at the distal end of the FPC board 6, and the proximal end of the FPC board 6 extends to the lower side of the support member 4 through an hole 4k formed in the support member 4 and is connected to another FPC board 11 that is installed on the rigid board 9.

Figure 7:
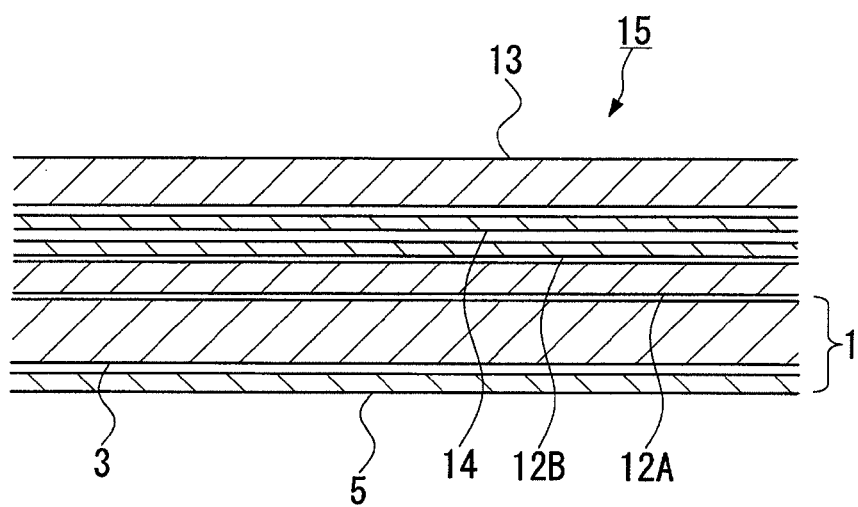
FIG. 7 is a fragmentary enlarged vertical sectional view showing a liquid crystal display apparatus comprising the planar light-emitting device of the first embodiment of the present invention, with the support member and the rigid board removed therefrom.

FIG. 7 is a fragmentary sectional view of a liquid crystal display apparatus 15 according to the present invention. The liquid crystal display apparatus 15 is a display apparatus applicable to a liquid crystal display of a large-sized liquid crystal television, for example, and has a liquid crystal display panel 13 and a planar light-emitting device 1 disposed at the lower surface side of the liquid crystal display panel 13.

Specifically, the liquid crystal display apparatus 15 includes a planar light-emitting device 1 having a plurality of light-emitting units 7 arrayed on a rigid board 9, a diffusing plate 12A that diffuses light from the planar light-emitting device 1 to obtain a uniform light intensity distribution, a diffusing sheet 12B disposed over the diffusing plate 12A, a prism sheet 14 disposed over the diffusing sheet 12B to direct light as upward illuminating light from the diffusing sheet 12B toward a liquid crystal display panel 13, disposed over the prism sheet 14, and a reflecting sheet 5 disposed underneath the lightguide plate 3.

The diffusing plate 12A and the diffusing sheet 12B are a plate and a sheet, respectively, made of a transparent resin, e.g. an acrylic or polycarbonate resin, having silica particles or the like dispersed therein.

The prism sheet 14 is a transparent sheet-shaped member for collecting light from the diffusing sheet 12B toward upward and the prism sheet 14 has a plurality of prisms having mutually parallel ridges on the upper surface of the prism sheet 14. The prisms of the prism sheet 14 extend to intersect, in plan view, the optical axis of light from the LED light source 2 that is guided through the lightguide plate 3. To obtain high directivity in the upward direction, in particular, the prisms of the prism sheet 14 are set to extend parallel to a direction perpendicularly intersecting the optical axis of light from the LED light source 2 in plan view.

The liquid crystal display panel 13 is a transmissive or semitransmissive liquid crystal display panel. In the case of a transmissive liquid crystal display panel 13, for example, it has a panel body having a liquid crystal material, e.g. TN liquid crystal or STN liquid crystal, sealed with a sealant in a gap between an upper substrate and a lower substrate, each having a transparent electrode layer, an alignment film and a polarizer.

Thus, the planar light-emitting device 1 of the first embodiment comprises a plurality of light-emitting units 7 arrayed on a rigid board 9. Each light-emitting unit 7 has a support member 4 that secures a lightguide plate 3 mounted on the support member 4 together with an LED light source 2. Therefore, the optical axis of the LED light source 2 and the light-entrance surface 3a of the lightguide plate 3 can be positioned with respect to each other on the support member 4 of each light-emitting unit 7 in advance to arraying a plurality of such light-emitting units 7 on the rigid board 9. Accordingly, a higher positional accuracy can be obtained than in the case of mounting LED light sources 2 and lightguide plates 3 separately and directly on a large-sized rigid board 9. In addition, any light-emitting unit 7 having luminance non-uniformity or other problem can be replaced individually. Thus, the replacing operation can be performed easily. In addition, because the support member 4 and the rigid board 9 function as heat-dissipating members, high heat-dissipating characteristics can be obtained. Particularly, because the support member 4 is metallic, an even more enhanced heat-dissipating effect can be obtained.

Further, because both right and left side edge surfaces of the lightguide plate 3 have respective projecting portions 3g projecting directly above the lightguide plate hooks 4a extending from the support member 4, the lightguide plate hooks 4a are hidden by the projecting portions 3g as the lightguide plate 3 when seen from the light-exiting surface side. Thus, the lightguide plate hooks 4a do not appear as dark spots of light, and uniform backlight illumination can be obtained. This advantageous effect can be further enhanced by providing the top surface of each projecting portion 3g with microscopic optical configurations that direct the guided light to be emitted upward.

Further, the lightguide plates 3 are each in the shape of a rectangle in which the ratio of the short side to the long side is set to from 0.5 to 0.6, and arranged in a matrix in which the numbers of rows and columns are equal to each other. This arrangement enables an increase in size of the backlight unit while keeping the aspect ratio of 16:9, which is the mainstream aspect ratio for large-sized backlight units. Accordingly, the liquid crystal display apparatus 15 employing the planar light-emitting device 1 as a backlight unit can display a favorable image of high luminance uniformity and large area by a plurality of LED light sources and lightguide plates that are readily replaceable and mounted with high accuracy.

Figure 8:
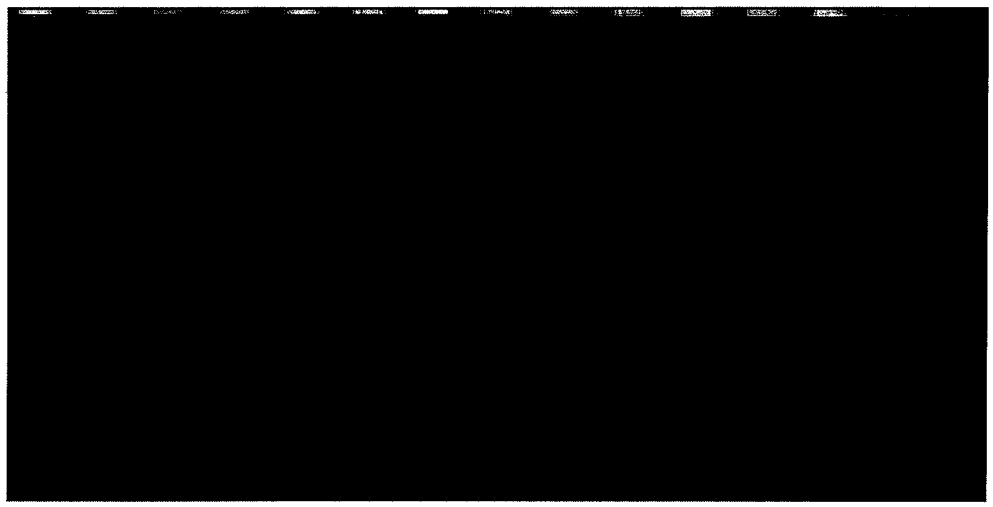
FIG. 8 is an image showing the luminance distribution on the light-exiting surface of one light-emitting unit when the associated LED light source is turned on to emit light, the light-emitting unit being prepared on the basis of the present invention.

FIG. 8 is an image showing the luminance distribution on a light-emitting unit prepared according to the present invention.

Figure 9:
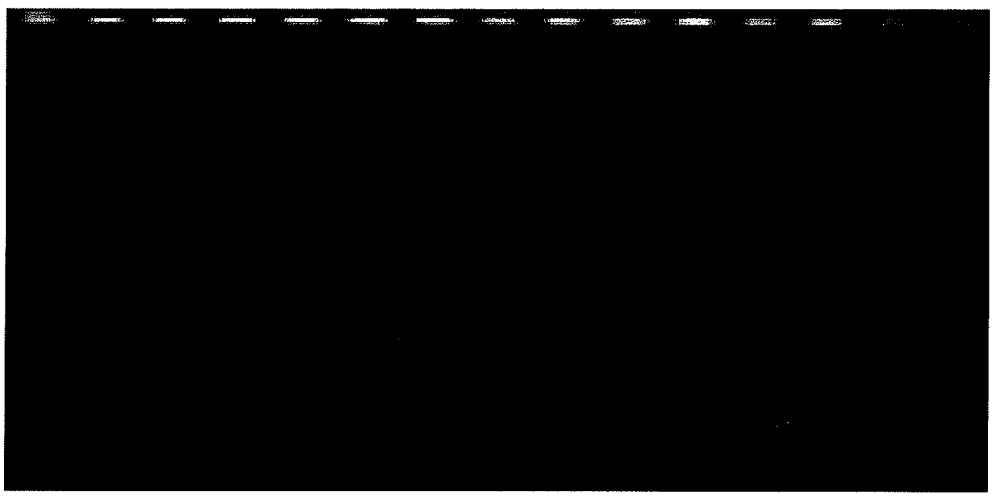
FIG. 9 is an image showing the luminance distribution on the light-exiting surface of a light-emitting unit when the associated LED light source is turned on to emit light, the light-emitting unit having a lightguide plate with a mirror-finished light-entrance surface and having no protruding portion at the light-entrance surface, for comparison with the light-emitting unit shown in FIG. 8.
Figure 10:
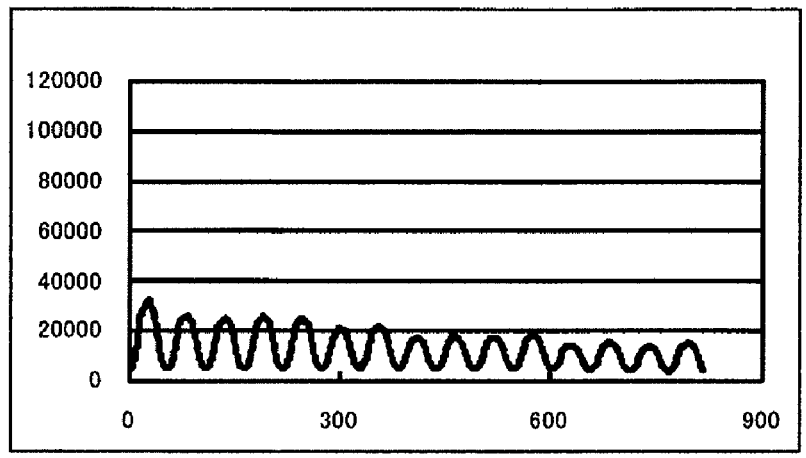
FIG. 10 is a graph showing the luminance distribution at high-luminance regions of the light-exiting surface of the light-emitting unit in FIG. 8, and the ordinate axis represents the luminance, and the abscissa axis represents the position.
Figure 11:
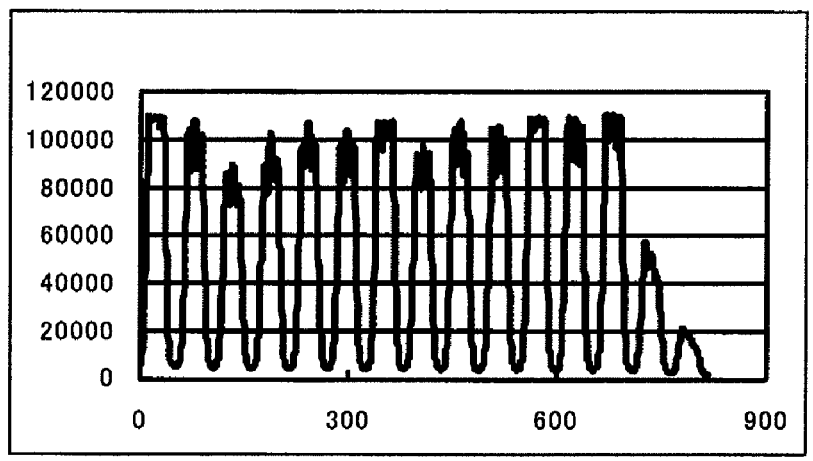
FIG. 11 is a graph showing the luminance distribution at high-luminance regions of the light-exiting surface of the light-emitting unit in FIG. 9, in which the ordinate axis represents the luminance, and the abscissa axis represents the position.

The image of FIG. 8 shows the luminance distribution on the light-exiting surface of a light-emitting unit in which only a lightguide plate 3 forward of an LED light source 2 is present, i.e. there is no other adjacent lightguide plate 3 at the back or the opposite side of the light-exiting surface side of the LED light source 2, and the LED light source 2 is installed at a position 0.5 mm away from the light-entrance surface 3a of the forward lightguide plate 3 underneath the first protruding portion 3d at the entrance surface 3a. FIG. 9 is for comparison to FIG. 8. The image of FIG. 9 shows the luminance distribution on the light-exiting surface of a light-emitting unit using a conventional lightguide plate having a mirror-finished light-entrance surface and having no protruding portion 3d at the light-entrance surface side. In the light-emitting unit, the LED light source 2 is installed at a position 0.5 mm away from the light-entrance surface 3a of the lightguide plate. In each figure, white spots along the upper edge of the image represent regions where the luminance is particularly high because the regions are near the LEDs constituting the LED light source 2 and hence receive light of high intensity. It will be understood that, in the light-emitting unit according to the present invention, shown in FIG. 8, the luminance at the white spot regions is lower than in the light-emitting unit shown in FIG. 9. Therefore, the light-emitting unit according to the present invention can obtain an even more uniform luminance distribution throughout the light-exiting surface of the light-emitting unit. It should be noted that these figures show images subjected to image processing to facilitate the comparison, and hence the regions of each image other than the white spots are substantially black. FIGS. 10 and 11 are graphs showing the luminance distributions in FIGS. 8 and 9, respectively. The ordinate axis represents the luminance (candela), and the abscissa axis represents the respective positions of the LEDs constituting the LED light source 2.

Figure 12:
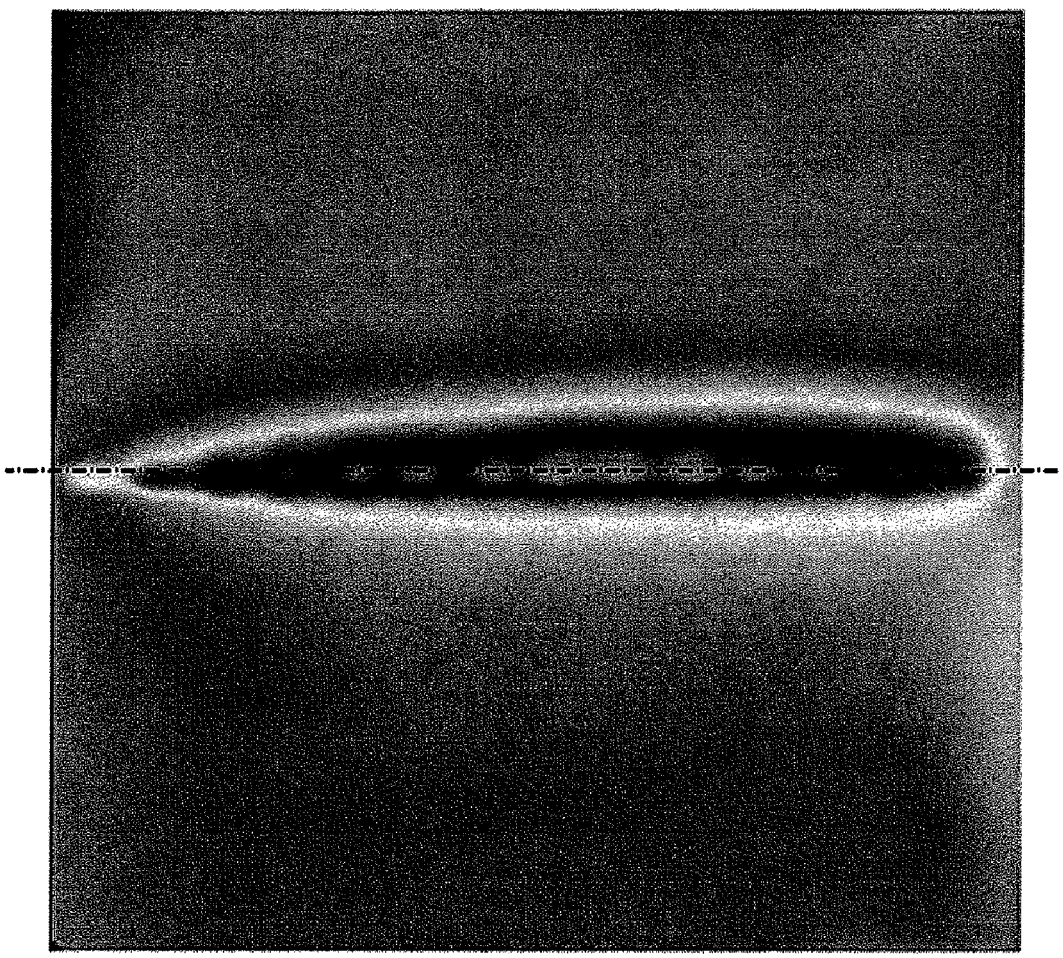
FIG. 12 is an image showing the luminance distribution on the light-exiting surfaces of two mutually adjacent light-emitting units when the associated LED light source is turned on to emit light, the light-emitting units being prepared on the basis of the present invention.
Figure 13:
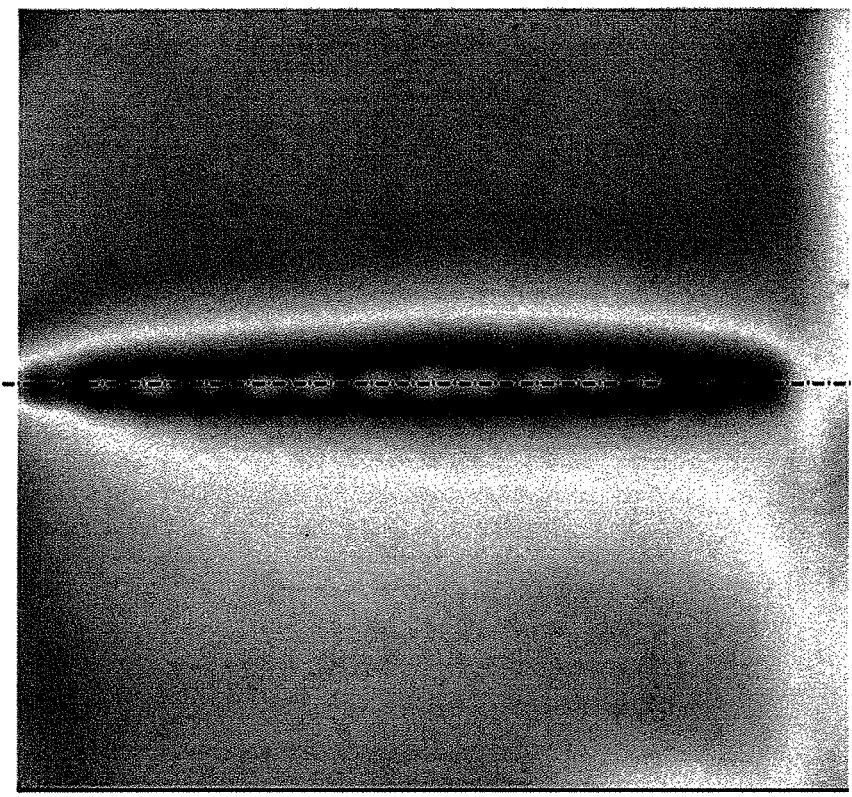
FIG. 13 is an image showing the luminance distribution on the light-exiting surfaces of two mutually adjacent light-emitting units when the associated LED light source is turned on to emit light, the light-emitting units each having a lightguide plate with a mirror-finished light-entrance surface and having no protruding portion at the light-entrance surface, for comparison with the light-emitting units shown in FIG. 12.
Figure 14:
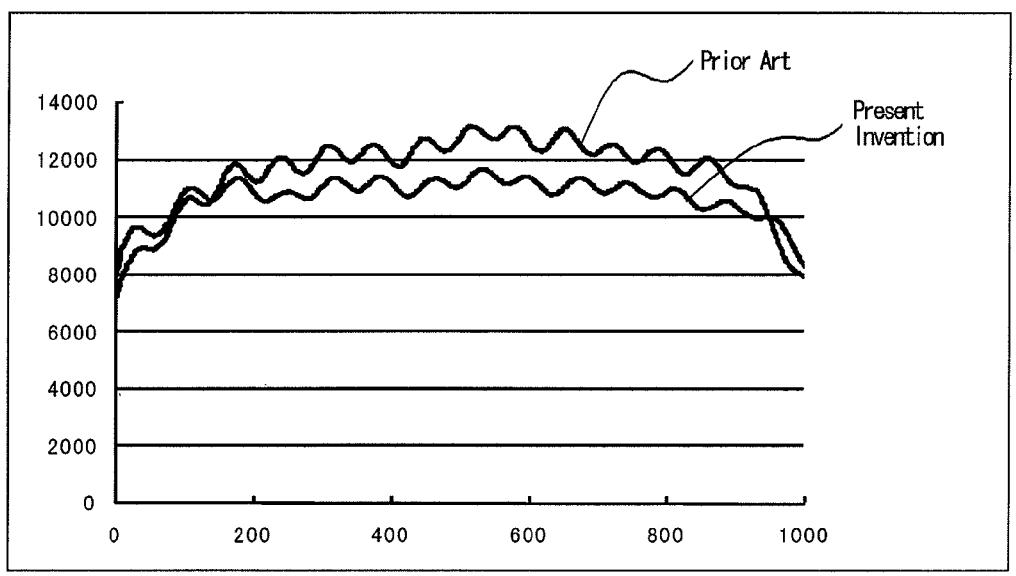
FIG. 14 is a graph showing the luminance distribution on the light exiting surfaces along a row of LED light sources disposed between the two mutually adjacent light-emitting units in each of FIGS. 12 and 13.

FIG. 12 is an image showing the luminance distribution on a pair of adjacently disposed light-emitting units prepared according to the present invention under the conditions different from such light-emitting unit in FIG. 8. That is, FIG. 12 shows the luminance distribution on the light-exiting surface of a light-emitting unit in which lightguide plates 3 are disposed forward and rearward, respectively, of an LED light source 2 with their first and second protruding portions 3$d$ and 3$c$ abutting against each other, and the light-exiting surface of the LED light source 2 is installed at a position 0.5 mm away from the lightentrance surface 3$a$ of the lightguide plate 3 underneath the abutting first and second protruding portions 3$c$ and 3$d$. FIG. 13 is for comparison to FIG. 12 and shows the luminance distribution on the light-exiting surface of a light-emitting unit in which lightguide plates not having a first protruding portion 3$d$ at the entrance surface and having only a second protruding portion 3$c$ at the opposite surface are disposed under the same conditions as the above. FIG. 14 is a graph showing the luminance distributions in these light-emitting units in the array direction of the LEDs constituting the LED light source 2.

It will be understood from these results that the light-emitting units shown in FIG. 13 has a large luminance difference between the central portion and the opposite end portions in the vicinity of the mutually abutting end edge surfaces of the lightguide plates, whereas the light-emitting units shown in FIG. 12 has a reduced luminance difference and exhibits improved luminance uniformity.

It should be noted that the present invention is not necessarily limited to the foregoing embodiments but can be modified in a variety of ways without departing from the scope of the present invention.

For example, RGB-LEDs may be used as the LED light source to emit light of all colors. An RGB-LED may comprise, for example, a combination of a red LED element (R), a green LED element (G) and a blue LED element (B) mounted in one package. Alternatively, LEDs emitting mutually different colors of light may be provided for each lightguide plate. In these cases, it is possible to illuminate a liquid crystal display panel or the like with various colors of light over the whole planar light-emitting device or for each light-emitting unit by controlling the applied electric current in each LED.

Although one diffusing plate and one diffusing sheet are used in the liquid crystal display apparatus of the foregoing embodiments of the present invention, either of the diffusing plate and the diffusing sheet may be omitted, or at least either of them may comprise a plurality of them. The liquid crystal display apparatus may have a diffusing plate or sheet between the prism sheet and the liquid crystal display panel. In other words, the installation position and the number of diffusing plates or sheets used are properly set with haze taken into account to correct luminance non-uniformity.

Although one prism sheet is used in the foregoing embodiments, liquid crystal display apparatus may have two prism sheets.

Although the foregoing embodiments employ a diffusing plate, a diffusing sheet and a prism sheet, each having a size corresponding to that of the liquid crystal display panel, these members may each comprise a plurality of split segments that are arrayed in the same way as the lightguide plates.

In the foregoing embodiments, a plurality of light-emitting units having the same rectangular shape are arranged in a matrix, light-emitting units having other shapes may be arrayed to form a planar light-emitting device. For example, a plurality of light-emitting units having the same square shape may be arranged in a matrix.

The plurality of light-emitting units may comprise a combination of at least two different types of light-emitting units that are mutually different in size or shape. For example, it is possible to array a combination of a plurality of different types of polygonal light-emitting units, e.g. hexagonal and triangular light-emitting units in plan view. It is also possible to array a combination of light-emitting units of different sizes, e.g. large- and small-sized light-emitting units. Employing these various light-emitting units different in shape and size makes it possible to provide a planar light-emitting device compatible with liquid crystal display panels of various shapes and sizes.

The invention claimed is:

1. A planar light-emitting device comprising a plurality of light-emitting units, each respective light-emitting unit of the plurality of light-emitting units comprising:

a lightguide plate having an upper surface as a light-exiting surface, a lower surface opposite to the upper surface, a peripheral side surface extending between respective peripheral edges of the upper surface and the lower surface, and a light-entrance surface defined by a part of the peripheral side surface;

a light-emitting diode light source adjacently disposed to face the light-entrance surface and to emit light into the lightguide plate through the light-entrance surface; and a support member having the lightguide plate mounted thereon and securing the lightguide plate together with the light-emitting diode light source, wherein each respective light-emitting unit is arranged adjacent to another light-emitting unit of the plurality of light-emitting units, such that the light-exiting surfaces of the plurality of light-emitting units are substantially flush with one another, wherein the lightguide plate of each respective light-emitting unit has (i) an opposite surface opposite to the light-entrance surface of the lightguide plate of the respective light-emitting unit, such that the opposite surface is defined by a part of the peripheral side surface of the respective light-emitting unit, (ii) a first protruding portion protruding from and along the light-entrance surface of the lightguide plate of the respective light-emitting unit, and (iii) a second protruding portion protruding from and along the opposite surface of the lightguide plate of the respective light-emitting unit, wherein, in each pair of adjacently disposed light-emitting units of the plurality of light-emitting units, with the light-entrance surface of the lightguide plate of one of the adjacently disposed light-emitting units of the pair opposed to the opposite surface of the lightguide plate of another of the adjacently disposed light-emitting units of the pair, the first protruding portion of the one adjacently disposed light-emitting unit abuts against the second protruding portion of the another adjacently disposed light-emitting unit, wherein the light-emitting diode light source of each respective light-emitting unit (i) has a light-exiting surface and (ii) is disposed in a space formed underneath the first protruding portion of the lightguide plate of the respective light-emitting unit abutting against the second protruding portion of the lightguide plate of another adjacent light-emitting unit, the first protruding portion of the lightguide plate of the respective light-emitting unit receiving light emitted through the light-exiting surface of the light-emitting diode light source of the respective light-emitting unit, wherein the lightguide plates of the plurality of light-emitting units are arranged in a matrix, and wherein each respective lightguide plate further includes right and left side edge surfaces extending between the light-entrance surface and the opposite surface, and includes a projecting portion projecting from each of the right and left side edge surfaces and having an outwardly and downwardly inclined upper surface extending from the light-exiting surface of the respective lightguide plate.

2. The planar light-emitting device of claim 1, wherein each of the first protruding portion and the second protruding portion has an upper surface, a lower surface opposite to the upper surface, and a distal end surface extending between a distal end edge of the upper surface and a distal end edge of the lower surface, and wherein the distal end surface of the first protruding portion of the one light-emitting unit abuts against the distal end surface of the second protruding portion of the another light-emitting unit.

3. The planar light-emitting device of claim 2, wherein the second protruding portion at the opposite surface protrudes more than the first protruding portion at the light-entrance surface.

4. The planar light-emitting device of claim 1, wherein each respective light-emitting unit has the light-emitting diode light source and the lightguide plate integrated together.

5. The planar light-emitting device of claim 1, wherein each respective lightguide plate of the plurality of light-emitting units is rectangular in plan view and has a ratio of a short side to a long side of the respective lightguide plate from 0.5 to 0.6, and wherein the plurality of light-emitting units are arranged in a matrix in which numbers of rows and columns are equal to each other.

6. The planar light-emitting device of claim 1, wherein each respective lightguide plate of the plurality of light-emitting units is square in plan view.

7. A liquid crystal display apparatus comprising:
a liquid crystal display panel; and
the planar light-emitting device of claim 1, which is disposed at a back of the liquid crystal display panel.

8. A liquid crystal display apparatus comprising:
a liquid crystal display panel; and
the planar light-emitting device of claim 2, which is disposed at a back of the liquid crystal display panel.

9. A liquid crystal display apparatus comprising:
a liquid crystal display panel; and
the planar light-emitting device of claim 3, which is disposed at a back of the liquid crystal display panel.

10. The planar light-emitting device of claim 1, wherein, in each pair of the adjacently disposed light-emitting units, the light-emitting diode light source is disposed under the abutting first protruding portion of the lightguide plate of one of the adjacently disposed light-emitting units of the pair and the second protruding portion of the lightguide plate of another of the adjacently disposed light-emitting units of the pair.

11. The planar light-emitting device of claim 6, wherein each respective lightguide plate includes right and left side edge surfaces extending between the light-entrance surface and the opposite surface, and wherein lightguide plates of the plurality of light-emitting units face each other at at least one of the respective right and left side edge surfaces.

12. The planar light-emitting device of claim 2, wherein the upper surfaces of the first protruding portion and the second protruding portion of each respective lightguide plate are flush with the upper surface of the respective lightguide plate.

13. A planar light-emitting device comprising a plurality of light-emitting units, each respective light-emitting unit of the plurality of light-emitting units comprising:

a lightguide plate having an upper surface as a light-exiting surface, a lower surface opposite to the upper surface, a peripheral side surface extending between respective peripheral edges of the upper surface and the lower surface, and a light-entrance surface defined by a part of the peripheral side surface; and a light-emitting diode light source adjacently disposed to face the light-entrance surface and to emit light into the lightguide plate through the light-entrance surface, wherein each respective light-emitting unit is arranged adjacent to another light-emitting unit of the plurality of light-emitting units, such that the light-exiting surfaces of the plurality of light-emitting units are substantially flush with one another, wherein the lightguide plate of each respective light-emitting unit has (i) an opposite surface opposite to the light-entrance surface of the lightguide plate of the respective light-emitting unit, such that the opposite surface is defined by a part of the peripheral side surface of the respective light-emitting unit, (ii) a first protruding portion protruding from and along the light-entrance surface of the lightguide plate of the respective light-emitting unit, and (iii) a second protruding portion protruding from and along the opposite surface of the lightguide plate of the respective light-emitting unit, wherein, in each pair of adjacently disposed light-emitting units of the plurality of light-emitting units, with the light-entrance surface of the lightguide plate of one of the adjacently disposed light-emitting units of the pair opposed to the opposite surface of the lightguide plate of another of the adjacently disposed light-emitting units of the pair, the first protruding portion of the one adjacently disposed light-emitting unit abuts against the second protruding portion of the another adjacently disposed light-emitting unit, wherein the light-emitting diode light source of each respective light-emitting unit has a light-exiting surface disposed underneath the first protruding portion of the lightguide plate of the respective light-emitting unit receiving light emitted through the light-exiting surface of the light-emitting diode light source of the respective light-emitting unit, and wherein each respective lightguide plate of the plurality of light-emitting units is square in plan view and arranged in a matrix, wherein each respective lightguide plate further includes right and left side edge surfaces extending between the light-entrance surface and the opposite surface, and includes a projecting portion projecting from each of the right and left side edge surfaces and having an outwardly and downwardly inclined upper surface extending from the light-exiting surface of the respective lightguide plate.

14. The planar light-emitting device of claim 1, wherein the light-entrance surface of each respective lightguide plate of the plurality of light-emitting units includes a plurality of prisms.

15. The planar light emitting device of claim 14, wherein each prism of the plurality of prisms of each respective lightguide plate extends along the light-entrance surface between the edges of the upper surface and the lower surface of the respective lightguide plate.

16. The planar light-emitting device of claim 1, wherein the light-emitting diode light source of each respective light-emitting unit of the plurality of light-emitting units includes a flexible printed circuit board (i) including a distal end portion connected to the light-emitting diode light source and (ii) including a proximal end extending to a lower side of the support member through a hole formed in the support member.

17. A planar light-emitting device comprising a plurality of light-emitting units, each respective light-emitting unit of the plurality of light-emitting units comprising:
- a lightguide plate having an upper surface as a light-exiting surface, a lower surface opposite to the upper surface, a peripheral side surface extending between respective peripheral edges of the upper surface and the lower surface, and a light-entrance surface defined by a part of the peripheral side surface;
- a light-emitting diode light source adjacently disposed to face the light-entrance surface and to emit light into the lightguide plate through the light-entrance surface, and
- a support member having the lightguide plate mounted thereon and securing the lightguide plate together with the light-emitting diode light source,
- wherein each respective light-emitting unit is arranged adjacent to another light-emitting unit of the plurality of light-emitting units, such that the light-exiting surfaces of the plurality of light-emitting units are substantially flush with one another;
- wherein the lightguide plate of each respective light-emitting unit has (i) an opposite surface opposite to the light-entrance surface of the lightguide plate of the respective light-emitting unit, such that the opposite surface is defined by a part of the peripheral side surface of the respective light-emitting unit (ii) a first protruding portion protruding from and along the light-entrance surface of the lightguide plate of the respective light-emitting unit, and (iii) a second protruding portion protruding from and along the opposite surface of the lightguide plate of the respective light-emitting unit,
- wherein, in each pair of adjacently disposed light-emitting units, of the plurality of light-emitting units, with the light-entrance surface of the lightguide plate of one of the adjacently disposed light-emitting units of the pair opposed to the opposite surface of the lightguide plate of another of the adjacently disposed light-emitting units of the pair, the first protruding portion of the one adjacently disposed light-emitting unit abuts against the second protruding portion of the another adjacently disposed light-emitting unit,
- wherein the light-emitting diode light source of each respective light-emitting unit (i) has a light-exiting surface and (ii) is disposed in a space formed underneath the first protruding portion of the lightguide plate of the respective light-emitting unit abutting against the second protruding portion of the lightguide plate of another adjacent light-emitting unit, the first protruding portion of the lightguide plate of the respective light-emitting unit receiving light emitted through the light-exiting surface of the light-emitting diode light source of the respective light-emitting unit,
- wherein the lightguide plates of the plurality of light-emitting units are arranged in a matrix, and each respective light guide plate is square in plan view, and
- wherein each respective lightguide plate further includes right and left side edge surfaces extending between the light-entrance surface and the opposite surface, and includes a projecting portion projecting from each of the right and left side edge surfaces and having an outwardly and downwardly inclined upper surface extending from the light-exiting surface of the respective lightguide plate.

\* \* \* \* \*